Nov. 14, 1967  R. N. MELLOTT ETAL  3,353,082
FIXED POWER SUPPLY UTILIZING A COMMUTATED RECTIFIER
Filed April 20, 1964  2 Sheets-Sheet 1

INVENTORS
ROBERT N. MELLOTT
RICHARD W. PETERSEN
BY
*A. Wasserman*
ATTORNEY

Nov. 14, 1967  R. N. MELLOTT ETAL  3,353,082
FIXED POWER SUPPLY UTILIZING A COMMUTATED RECTIFIER
Filed April 20, 1964  2 Sheets-Sheet 2
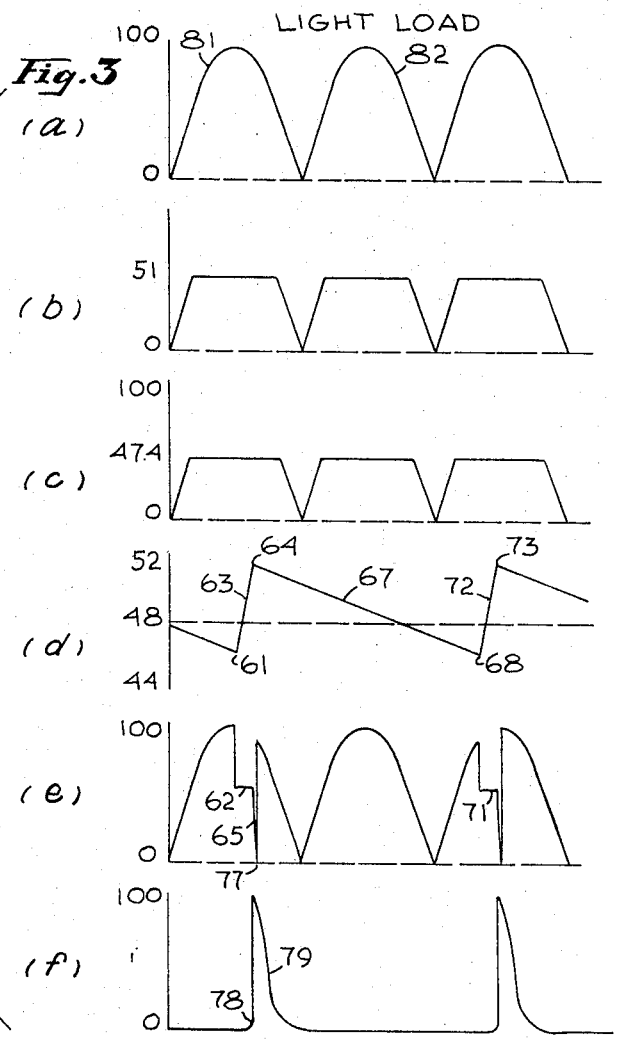
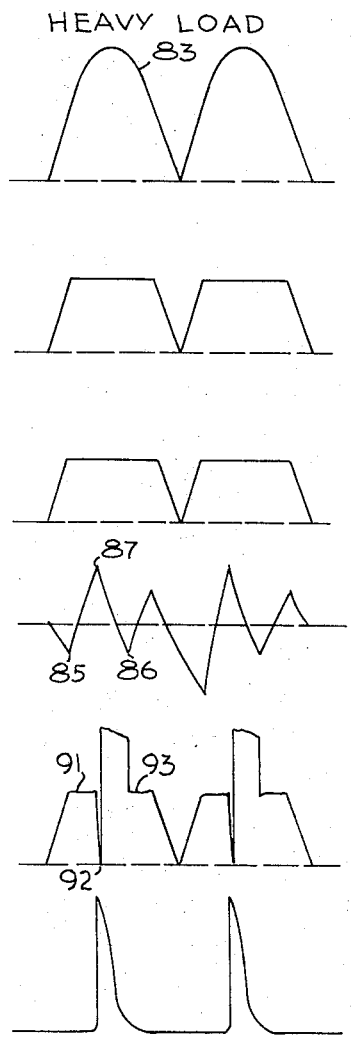
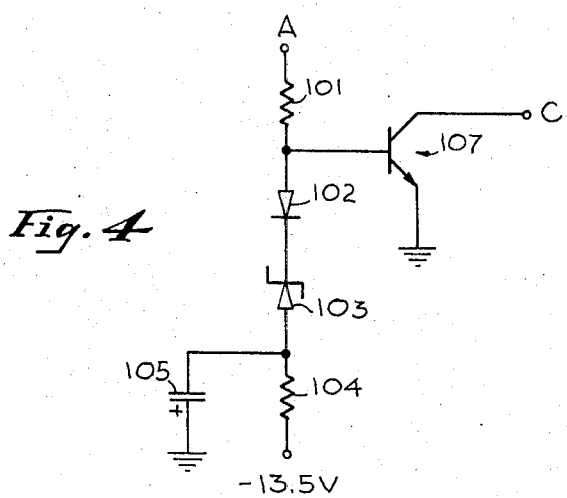
INVENTORS
ROBERT N. MELLOTT
RICHARD W. PETERSEN
BY
ATTORNEY

United States Patent Office 3,353,082
Patented Nov. 14, 1967

3,353,082
FIXED POWER SUPPLY UTILIZING A COMMUTATED RECTIFIER
Robert N. Mellott, Northridge, Los Angeles, Calif., and Richard W. Petersen, Fort Wayne, Ind., assignors to Interco, Inc., a corporation of Maryland
Filed Apr. 20, 1964, Ser. No. 360,821
7 Claims. (Cl. 321—16)

This invention relates to a power supply for providing a direct-current (D.C.) voltage that is maintained within predetermined amplitude limits. More particularly, the invention relates to a D.C. power supply which maintains the output voltage within those limits during large input voltage and load transients by means of controlled rectifiers, each of which may be turned on and off (commutated) several times during a single half-cycle of alternating current input voltage.

The use of relays, solenoids and other electromechanical devices for controlling the operation of various instruments and/or circuits is well known. Many such devices are adapted to be energized or driven from a D.C. power supply and, in order not to damage any device, it is important that the output voltage of the power supply not exceed the maximum voltage at which the device may be safely operated. It is similarly important that the output voltage of the power supply not fall below the minimum level necessary to energize the devices connected thereacross in order to prevent any of the devices from accidentally becoming deenergized. An adequate power supply, in addition to providing an output voltage which does not fall below a minimum level and does not exceed a maximum level even during input voltage transients, should also be able to so operate when large load transients occur. Such transients may occur, for example, due to variations in the number of devices which are simultaneously energized.

Some prior art D.C. power supplies which utilize silicon controlled rectifiers (SCR), such power supplies being hereinafter referred to as SCR power supplies, possess some of the characteristics hereinbefore described. However, these SCR power supplies employ conventional techniques of operating the silicon controlled rectifiers which limit their capability of supplying power subject to large load transients which is nevertheless within predetermined limits. For example, such prior art D.C. power supplies, which may be conventionally energized from a 60 cycle per second, 115 volt, alternating-current (A.C.) power source, are based on techniques of firing or triggering silicon controlled rectifiers as a function of the phase relationship of the signals or potential levels at the anodes and their respective gate terminals. Such techniques, usually referred to as "variable phase" firing, result in a single current pulse being provided to the output portions of the power supplies circuitry for each half-cycle of the A.C. input voltage. The time of the end of each pulse is controlled only by the cycling of the input voltage, which may result in pulses of sufficient duration to cause the output voltage of the power supply to exceed a desired limit. Furthermore, such standard SCR power supplies are not isolated from reacting to large, fast, load transients, which may result in undesirably large output voltage transients. Such disadvantages are substantially overcome by the present invention.

The present invention is based on utilizing a pair of controlled rectifiers, the first rectifier controlling the supply of power so that the output voltage level does not fall below a minimum predetermined value, and the second rectifier controlling the first rectifier so that the output voltage level does not exceed a maximum value, the minimum and maximum values being derived from reference signals which are a function of the level of the input signal. The two rectifiers are interconnected so that they may be controlled in relatively short time periods compared to the period of the A.C. input to the power supply, so that the output voltage can advantageously be controlled despite sudden large load transients.

Basically, in a D.C. power supply incorporating the present invention, the first rectifier hereinbefore referred to senses the level of the output voltage with respect to a reference signal or voltage, and when the level of the output voltage falls below a minimum predetermined level, which substantially equals the reference signal, the first rectifier is triggered or fired. The current passed by the first rectifier may be used to charge up an output capacitor, the potential across which is the output voltage of the power supply. Once the first rectifier is triggered, it continues to pass current until the A.C. input voltage falls below the level of the output voltage or until the output voltage reaches the maximum permissible level. In the latter event, the second rectifier is triggered to its conducting state, which cuts off current flow through the first rectifier, thereby preventing the output voltage of the power supply from exceeding the maximum desired level. The second rectifier, which, once triggered, cuts off the first rectifier, is so interconnected with resistive and capacitive components that after a predetermined time period it is automatically cut off, i.e., switched to its non-conducting state. The first rectifier remains in its non-conducting state until the level of the output voltage again reaches the minimum tolerable level, at which time the first rectifier switches again to its conducting state to prevent the level of the output voltage from falling below the minimum desired level. The first and second rectifiers are so arranged that the first rectifier may be turned on and off several times during each half-cycle of the A.C. input voltage to maintain very close control over the output voltage level.

In another embodiment, means are provided for preventing conduction by the first rectifier in the event of failure of an external voltage source, such as a transistor bias source. If the external source fails, the output voltage of the power supply of the invention is quickly reduced to zero to prevent damage to transistors or the like to which it may be supplying voltage.

The present invention may better be explained in connection with a specific example. However, it is understood that the example is presented for explanatory purposes only and that the invention is not limited thereto. The following description will be mostly devoted to a power supply energized by a conventional 60 cycle, 115 volt power source for supplying D.C. output voltage which may vary between 47.4 volts and 52 volts. Although the embodiment utilizes SCR's, it is also understood that the invention may be applied to the control of other rectifying devices, such as discharge tubes, transistors, etc.

Further objects and advantages of the invention will become apparent from the following description, taken in conjunction with the accompanying drawings, in which.

Figure 2:
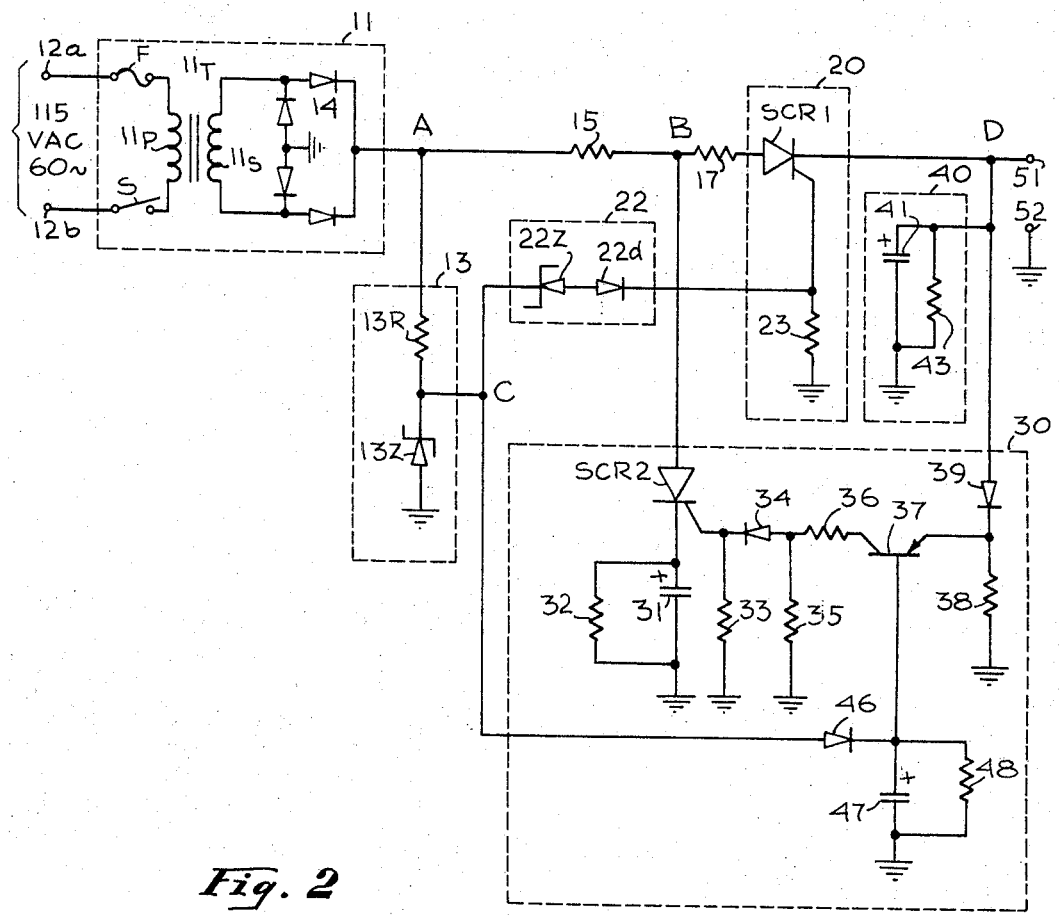
FIGURE 2 is a combination block and schematic diagram of circuitry incorporating the invention.

FIGS. 3(a), 3(b), 3(c), 3(d), 3(e) and 3(f) are waveform diagrams useful in explaining the operation of the circuitry shown in FIG. 2; and FIG. 4 is a schematic diagram of another embodiment of the invention.

Figure 1:
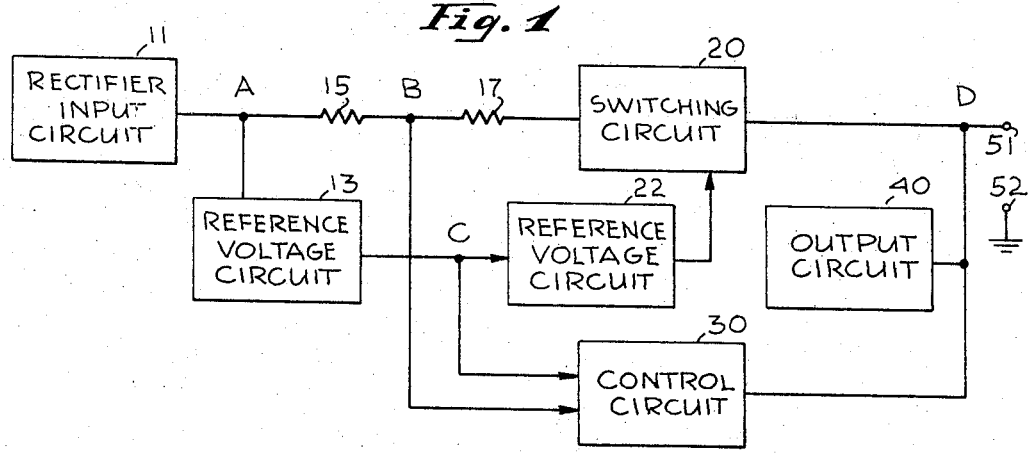
FIGURE 1 is a block diagram of a power supply embodying the present invention.

Reference is now made to FIG. 1 wherein the output of a full-wave rectifier input circuit 11 is shown connected at a point A to a first reference voltage circuit 13 and to one terminal of a resistor 15, the other terminal of the resistor 15 being connected at a point B to a resistor 17 whose other terminal is connected to a switching circuit 20. The first reference voltage circuit 13 is also connected to the switching circuit 20 through a second reference voltage circuit 22. A control circuit 30 is connected to a junction point C between the first reference voltage circuit 13 and the second reference voltage circuit 22. The control circuit 30 is also connected to the point B between the resistors 15 and 17. The switching circuit 20 is connected to an output circuit 40 at a junction point D, which is also connected to one output terminal, designated by the numeral 51. Another output terminal 52 is shown connected to ground potential. The control circuit 30 is also connected to the point D so that the circuit 30 may continuously sense the output voltage of the circuit 40 as well as control its level, as will be described hereinafter in detail.

In operation, the input circuit 11 provides a full-wave rectified input signal or voltage, which when it exceeds a predetermined amplitude or level, causes the reference voltage circuit 13 to provide a first reference signal to the reference circuit 22, which in turn provides switching to the switching circuit 20 a second reference voltage signal of a preselected amplitude. This second reference signal is continuously compared with the amplitude of the output voltage at the point D, which is the same as the amplitude level at the output terminal 51. Whenever the level of the output voltage falls below the level of the second reference signal, which hereinafter is also referred to as the predetermined minimum level, the circuit 20 is, in effect, switched on to cause current to flow through the resistors 15 and 17 and into the output circuit 40 to charge a capacitor in the output circuit and thereby increase the level of the output voltage to above the minimum level hereinbefore referred to. The control circuit 30 operates to prevent the switching circuit 20 from increasing the output voltage above the level of the first reference signal, which hereinafer is also referred to as the maximum predetermined value. The circuit 30, which, as previously stated, is connected to the point D, constantly senses the level of the output voltage so that whenever the level or amplitude thereof reaches the maximum permissible level, the circuit 30 is energized to prevent the switching circuit 20 from continuing to charge up the output circuit 40 by supplying current therethrough. Such an arrangement provides for an output voltage whose amplitude may fluctuate only between a minimum level and a maximum level, which substantially equal the levels of the second reference signal and the first reference signal, respectively. The circuitry herein disclosed prevents the output voltage from exceeding the maximum limit or falling below the minimum limit irrespective of variations in the load which may be connected to the terminals 51 and 52. Thus, even though the load may produce large load transients due to variations in the current requirement thereof, the voltage between the output terminals 51 and 52 will be held to a level between the limits hereinbefore referred to.

Reference is now made to FIG. 2, wherein the input circuit 11 is shown as comprising a transformer 11T, whose primary winding 11P is connected through a fuse F and switch S to input terminals 12a and 12b. The input terminals may be in turn connected to a conventional power line supplying 115 volt, 60 cycle per second, alternating current. A secondary 11S of the transformer 11T is connected to a full-wave diode bridge rectifier designated generally by the numeral 14, which provides a fully rectified, but unfiltered, voltage at a junction point designated by the letter A. In the particular example described, the parameters of the transformer 11T and the rectifying circuit 14 are chosen so that the voltage at the point A has a root mean square (RMS) value of approximately 78 volts and peaks of 100 volts. As previously noted, the resistor 15 is connected between the junction points A and B, and the resistor 17 is connected between the point B and the switching circuit 20. The point A is also conneced to the first reference voltage circuit 13 which, as shown in FIG. 2, comprises a serialy connected resistor 13R and a reference diode, such as a Zener diode 13Z, whose anode is connected to ground potential and whose cathode is connected to one end of the resistor 13R. The other end of the resistor 13R is connected to the point A. The junction between the cathode of the reference diode 13Z and the resistor 13R is connected to a junction point C, which is in turn connected to the second reference circuit 22, comprising a reference diode, such as a Zener diode 22Z, and a conventional diode 22D. The point C is connected to the cathode of the reference diode 22Z, and the anode of the reference diode is connected to the anode of the conventional diode 22D with the cathode of the conventional diode being connected to the switching circuit 20 by means of a line 21. The function of the conventional diode 22D is to prevent current from flowing from the switching circuit 20 toward the point C.

The switching circuit 20 comprises a resistor 23 and a controlled rectifier such as a silicon controlled rectifier, generally designated SCR1, having an anode, a cathode, and a gate control electrode. One terminal of the resistor 23 is connected to ground to provide a path for any leakage currents and the other terminal thereof is connected to the line 21 and to the gate electrode of the controlled rectifier SCR1. The anode of SCR1 is connected to one terminal of the resistor 17, and the cathode is connected to the point D and the output terminal 51.

The output circuit 30, previously referred to in connection with FIG. 1, is shown in FIG. 2 as comprising an output capacitor 41 connected in parallel with an output resistor 43 between ground potential and the point D, the resistor 43 serving as a discharge path for any charge stored in the capacitor 41 after the input power supplied to the power supply ceases. The circuitry hereinbefore described is so interconnected, as shown in FIG. 2, that whenever the level of the fully rectified voltage at the point A exceeds a level of 51 volts, the voltage at point C due to the reference diode 13Z is held substantially constant at 51 volts. As a result of the operation of the reference diode 22Z, the potential at the gate element of the controlled rectifier SCR1 is held at 47.4 volts. The controlled rectifier SCR1 remains in its non-conducting state so long as the potential of its cathode is above the potential of its gate terminal, that is, is above 47.4 volts. However, if due to a load being connected across the output terminals 51 and 52, the capacitor 41 discharges so that the potential at the point D falls below 47.4 volts, the controlled rectifier SCR1 is switched to a conducting state when its anode rises above that potential. As a result, current flows through the resistors 15 and 17 and through the controlled rectifier SCR1 to charge the output capacitor 41, thereby preventing the potential across it from dropping below a value of 47.4 volts.

It is seen that the circuitry thus far described is adapted to control the minimum level of the potential across the output capacitor 41, irrespective of any variations in the load that may be connected across the output terminals 51 and 52. This is accomplished during each half-cycle of the input voltage by switching the controlled rectifier SCR1 into its conducting state. This enables additional current to be supplied to the output capacitor 41, and thereby increase the potential thereacross, whenever the level of the output voltage reaches the minimum level of 47.4 volts. However, once the controlled rectifier SCR1 is switched to its conducting state, current will continue to flow and charge up the capacitor 41 until the anode potential of SCR1 drops below its cathode potential. Thus, the capacitor 41 may be charged to a potential level which exceeds a maximum desired level of output voltage. Therefore, means are provided to prevent the capacitor 41 from charging up to such an excessive level. Such means are represented by the control circuit 30, which is shown in FIG. 2 as comprising a controlled rectifier such as a silicon controlled rectifier, generally designated by SCR2, whose anode is connected to the point B and whose cathode is connected to ground through a parallel combination of a capacitor 31 and a resistor 32. The controlled rectifier SCR2 is connected through its gate element to one end of a resistor 33 whose other end is connected to ground, and to the cathode of a conventional diode 34 whose anode is connected to the juncture of two resistors 35 and 36. The thus far unconnected end of the resistor 35 is connected to ground, and the thus far unconnected end of the resistor 36 is connected to the collector of a transistor 37. The emitter of the transistor 37 is connected to one end of a resistor 38 whose other end is connected to ground. The emitter of the transistor 37 is also connected to the cathode of another conventional diode 39 whose anode is connected to the point D. The base of the transistor 37 is connected to a cathode of a conventional diode 46 and to ground through a parallel combination of a capacitor 47 and a resistor 48. The anode of the diode 46 is connected to the point C. The resistors 33, 35 and 38 provide paths for leakage currents and the diodes 34, 39 and 46 prevent current from flowing out of the control circuit except to ground.

For a better understanding of the manner in which the circuit 30 prevents the potential at point D from exceeding a predetermined maximum level, assume first that the capacitor 31 in the circuit 30 is discharged by means of the resistor 32. Further assume that the point C is at a potential of 51 volts. Because of the conventional diode 46 and the capacitor 47 and resistor 48 the potential at the base of the transistor 37 is also held at substantially 51 volts. As soon as the level of the output voltage rises above 51 volts at the point D (due to the capacitor 41 charging up via SCR1), current flows through the diode 39 into the emitter of the transistor 37, momentarily saturating the transistor 37. As a consequence, the collector of the transistor 37 is pulled up to a potential level of substantially 51 volts and a pulse of current flows through the resistor 36 and the conventional diode 34 into the gate element of the controlled rectifier SCR2, it being assumed that prior to this pulse of current, the controlled rectifier SCR2 was in its non-conducting state. When the gate current pulse is received, the controlled rectifier SCR2 is switched to its conducting state and the anode of the controlled rectifier SCR2 is pulled to substantially ground potential. At the time this occurs, a current of several amperes is flowing in the resistors 15 and 17 toward the capacitor 41 via SCR1, but despite the sudden drop in the potential at the point B this current does not change much instantaneously. The stray inductance of the transformer 11T keeps this current substantially constant during the short period of time necessary for charging up the capacitor 31 through SCR2. At that time, since the cathode of the controlled rectifier SCR1 is at 51 volts, this being the maximum limit of the desired output voltage, and furthermore since the controlled rectifier SCR1 has been in its conducting state, a pulse of reverse current is drawn through the controlled rectifier SCR1. This current is limited by the resistor 17 which is connected in series with the controlled rectifier. Thus, the total current flowing through the controlled rectifier SCR2 is made up of current flowing from the point A through the resistor 15 as well as current flowing from the point D through the controlled rectifier SCR1 and the resistor 17. The total current flowing through the controlled rectifier SCR2 charges up the capacitor 31 to a voltage substantially equal to 51 volts in an extremely short period of time, which is substantially equal to 50 microseconds. The reversal of the bias or current flow through the controlled rectifier SCR1 is sufficient to force it to its non-conducting state, thereby preventing additional charging current from being supplied to the output capacitor 41, thus preventing the output voltage from exceeding the maximum limit of 51 volts.

By the time the capacitor 31 is charged to 51 volts, the reverse current through the controlled rectifier SCR1 has ceased to flow, but current through the resistor 15 from the point A continues to flow into the capacitor 31 until it is charged several volts above the normal output voltage of the full wave rectifier 14. This overshoot of several volts is also caused by the stray inductance of the transformer 11T. Eventually, the capacitor 31 reaches its peak charge, the field of the stray inductance completely collapses and the bridge output voltage of the full wave rectifier 14 quickly drops to the voltage predicted for a full-wave rectified sine wave.

For about approximately 100 microseconds, the capacitor 31 remains charged above the output voltage of the full wave rectifier 42, thus back biasing the controlled rectifier SCR2, which causes it to return to its non-conducting state. It requires about 1 millisecond for the resistor 32 to discharge the capacitor 31 during which time the controlled rectifier SCR1 may begin conducting again, in order to prevent the level of the output voltage at the point D from falling below the minimum level of 47.4 volts. At the end of the one millisecond time period necessary for the resistor 32 to discharge the capacitor 31, the circuit 30 is again in a condition to sense the level of the output voltage at the point D and to cause the controlled rectifier SCR1 to go into its non-conducting state whenever the output voltage at the point D exceeds the maximum desired level.

For a better understanding of the operation of the present invention, reference is made to FIGS. 3(a), 3(b), 3(c), 3(d), 3(e) and 3(f) which are waveform diagrams, representing the waveforms of voltages at point A, point C, the gate element of the controlled rectifier SCR1, the output at point D, the anode of SCR1, and the cathode of the controlled rectifier SCR2, respectively. As seen from FIGS. 3(a) through 3(c), when the potential at the point A (FIG. 3(a)) exceeds 51 volts, the potential of the signal at point C, (FIG. 3(b)) is held substantially constant at the level of 51 volts, and similarly the potential at the gate element of the controlled rectifier SCR1, as shown in FIG. 3(c), is held substantially constant at a level of 47.7 volts. As seen from FIG. 3(e), as long as the level of the output voltage at the point D, which is represented by the waveform diagram of FIG. 3(d), is above 47.4 volts, the controlled rectifier SCR1 will remain in its non-conducting state, so that the potential waveform at the anode of SCR1 will be similar to that at the point B, that is, it will follow the wave shape of the voltage at the point A. However, as soon as the level of the output voltage at the point D is equal to or is below 47.4 volts, as indicated by numeral 61 in FIG. 3(d), the controlled rectifier SCR1 will switch into its conducting state so that current will flow therethrough and increase the charge on the capacitor 41 and thereby increase the level of the output voltage at the junction point D. The conducting state of the controlled rectifier SCR1 is represented in FIG. 3(c) by a line 62. During the conduction period of the controlled rectifier SCR1, the capacitor 41 is continuously supplied with current from the full-wave rectifier 14 (FIG. 2), thereby increasing the charge on the capacitor and increasing the potential at the point D, as indicated by a line 63 in FIG. 3(d). The capacitor 41 will continue to charge until the potential at the point D reaches the maximum desired output level, as indicated by a point 64, at which time the control circuit 30 (FIG. 2) will produce a current pulse on the gate element of the controlled rectifier SCR2, as previously explained, so that the controlled rectifier SCR2 is momentarily switched to its conducting state. The switching of the controlled rectifier SCR2 into the conducting state, in essence, produces reverse current flow through the controlled rectifier SCR1, thereby switching it to its non-conducting state, as indicated by the wave shape at 65 in FIG. 3(e). The controlled rectifier SCR1 will remain in the non-conducting state as long as the level of the output voltage at the point D, as indicated in FIG. 3(d) by a line 67, is above 47.4 volts. However, as soon as the level of the output voltage drops to 47.4 volts or starts falling below it, as indicated at a point 68, the controlled rectifier SCR1 will switch to its conducting state, as indicated by a line 71 in FIG. 3(e), again causing the flow of current into the capacitor 41 so as to increase the potential thereacross, as indicated by a line 72 in FIG. 3(d). As soon as the current supplied to the capacitor 41 increases the potential thereacross to a maximum level 73, the controlled rectifier SCR1 is again switched to its non-conducting state by means of the control circuit 30.

The operation of the circuit 30 in controlling the level of the output voltage at point D from exceeding a maximum desired level is partially diagrammed in FIGS. 3(e) and 3(f). As previously explained, once the level of the output voltage at point D equals the maximum desired level, such as indicated by the point 64 in FIG. 3(d), the controlled rectifier SCR2 is triggered to its conducting state, thus pulling the level of its anode and the point B to substantially ground potential, as indicated by a point 77 in FIG. 3(e). At substantially the same time, the capacitor 31 is charged up to at least the level of the output signal of the full-wave rectifier 14 at point A, the charging up being designated by a numeral 78 in FIG. 3(f). Thereafter, the controlled rectifier SCR2 is switched to its non-conducting state, resulting in the capacitor 31 discharging through the resistor 32 to substantially ground potential as indicated by a numeral 79 in FIG. 3(f).

From the foregoing description, it is seen that the circuitry disclosed herein provides a power supply which provides an output voltage within predetermined limits controlled by a pair of controlled rectifiers. One rectifier operates to prevent the level of the output voltage from falling below a minimum level by switching to its conducting state, thereby enabling current to be supplied to an output stage so as to raise the voltage level thereof. On the other hand, a second controlled rectifier is used to prevent the level of the output voltage from exceeding a maximum level by causing the first controlled rectifier to be switched to its non-conducting state and thereby prevent current from flowing therethrough whenever the level of the output voltage equals or exceeds the maximum limit. The number of times that the controlled rectifiers switch from one state to another during a half cycle of input voltage depends on the load conditions. For example, during a half-cycle period designated by a numeral 81 in FIG. 3(a), the output voltage level reaches the minimum and maximum levels 61 and 64 only once, so that the controlled rectifier SCR1 switches first to its conducting state and then to its non-conducting state, as indicated by the numerals 62 and 77 in FIG. 3(C). During a half-cycle period 82 shown in FIG. 3(a), the output voltage shown in FIG. 3(d) by numeral 67 does not reach either limit so that neither controlled rectifier is switched. On the other hand, during a half cycle period 83 (FIG. 3(a)) when the load is heavy, the output voltage (FIG. 3(d)) reaches the minimum level of 47.4 volts twice, as indicated by numerals 85 and 86, while it reaches the maximum level only once, as indicated by numeral 87. This causes the controlled rectifier SCR1 to switch to its conducting state, then be switched to its non-conducting state, and thereafter switch again to its conducting state, as indicated by numerals 91, 92 and 93, respectively. Thus, it is seen that the controlled rectifiers of the present invention may switch state more than once during each half cycle of input voltage, the number of switchings being dependent on the load.

As is well known in the art, devices used for control purposes, besides being supplied with power from a power supply such as hereinbefore described, are often provided with a biasing voltage. It is usually desirable to prevent such devices from being supplied with power whenever the biasing voltage source fails. In another embodiment of the present invention, disabling means such as are shown in FIG. 4 are provided for disabling the power supply disclosed herein, wherenever a negative voltage biasing source fails. As seen in FIG. 4, the disabling means comprise a serially connected resistor 101, a conventional diode 102, a reference diode 103 (such as a Zener diode) and a resistor 104 which are connected between the point A (FIG. 2) and a bias supply of −13.5 volts. Of course the diodes are connected with opposite polarities. The resistor 104 is shunted to ground by a capacitor 105, thereby providing low-pass filtering means to prevent high frequency noise passing through the bias source from affecting the operation of the disabling means described herein. The junction of the diode 102 and the resistor 101 is connected to the base of a transistor 107, whose emitter is connected to ground and whose collector is connected to the point C (FIG. 2).

Basically, under normal operation of the bias source of −13.5 volts, the resistor 101, the conventional diode 102, and the reference diode 103 act to provide a reference voltage of −3 volts at the base of the transistor 107. However, if the bias source for some reason is allowed to rise above −10.5 volts, bias current flows into the base of the transistor 107 thus saturating it, which in effect connects the collector of the transistor 107 to ground, thereby pulling the level of the reference voltage at the point C to ground. Under these conditions the voltage level at the gate terminal of the controlled rectifier SCR1 (FIG. 2) is pulled to ground, thus preventing SCR1 from switching to its conducting state even when the level of the output voltage at point D falls below the minimum level of 47.7 volts. Thus, the load and the resistor 43 will discharge the capacitor 41 and thereby terminate the supply of voltage from the power supply. The disabling means shown in FIG. 4 have been described in connection with a bias source of −13.5 volts. However, it is apparent that other reference sources may be used to provide a reference level at the base of the transistor 107 which, when affected by changes in the reference source, may cause the transistor 107 to trigger and thereby disable the power supply.

It is apparent to one skilled in the art that the preceding description is only one example of a circuit by means of which the teachings of the inventions may be practiced, and it is in no way intended to limit the invention thereto. Similarly, the following table of circuit parameters for providing a D.C. power supply having an output voltage limited to an amplitude between 47.7 volts and 51 volts and which is driven from a 115 volt A.C. power line is given for exemplary purposes only:

Transformer $T_1$ _____ Turns ratio 115:78.
Full wave rectifier 14 _____ 4–1N1204.
Silicon controlled rectifiers
   SCR1, SCR2 _____ 2N685.
Transistor 37 _____ 2N1041.
Transistor 107 _____ 2N1482.
Reference diode 13Z _____ 1N2997B.
Reference diode 22Z _____ 1N747A.

Reference diode 103 _____ 2-1N752A.
Conventional diodes
  22D, 34, 46 _____ 1N3070.
Conventional diodes
  39 and 102 _____ 1N658.
Resistor 15 _____ 6 ohms, 50 watts.
Resistor 17 _____ 2 ohms, 50 watts.
Resistor 13R _____ 1,000 ohms, 10 watts.
Resistor 23 _____ 22,000 ohms, 1 watt.
Resistor 43 _____ 2,200 ohms, 2 watts.
Resistor 32 _____ 100 ohms, 50 watts.
Resistor 33 _____ 22,000 ohms, 1 watt.
Resistor 35 _____ 2,200 ohms, 1 watt.
Resistor 36 _____ 1,000 ohms, 5 watts.
Resistor 38 _____ 68,000 ohms, 1 watt.
Resistor 48 _____ 15,000 ohms, 1 watt.
Resistor 101 _____ 10,000 ohms, 1 watt.
Resistor 104 _____ 10 ohms, 1 watt.
Capacitor 31 _____ 8 microfarads, 150 volts.
Capacitor 41 _____ 1,200 microfarads, 100 volts.
Capacitor 47 _____ 8 microfarads, 100 volts.
Capacitor 105 _____ 4.50 microfarads, 30 volts.

Summarizing briefly, the present invention comprises a novel power supply using a first controlled rectifier which switches to its conducting state whenever the level of the output voltage reaches a minimum desired level. A second controlled rectifier is used to momentarily switch to its conducting state and thereby cause the first controlled rectifier to become non-conducting whenever the level of the output voltage reaches a desired maximum level. Thus the two rectifiers cause the output voltage level to be between the minimum and maximum limits irrespective of substantially large load transients. In addition, in another embodiment of the present invention, disabling means are provided to disable the supply of output voltage whenever a reference bias source produces a signal of a predetermined level.

Although there has been described a specific arrangement for controlling the level of an output voltage to be within predetermined limits, it will be appreciated that the invention is not limited to use in power supplies only, but may be employed whenever it is desired to maintain the voltage level of any output source within predetermined boundaries. Accordingly, any and all modifications, variations in circuitry or equivalent arrangements falling within the scope of the annexed claims should be considered to be part of the invention.

The embodiments of the invention in which an exclusive property or privilege is claimed are defined as follows:

1. An apparatus responsive to a source of a direct current supply voltage of varying amplitude for providing to a load a direct current output voltage whose amplitude remains substantially within predetermined limits comprising:
    a source of a first reference voltage;
    a controlled rectifier having an anode, a cathode, and a gate and capable of defining either an open or closed condition; a first impedance;
    means connecting said first impedance and said rectifier anode and cathode in series between said source of supply voltage and said load;
    means connected to said rectifier gate for causing said rectifier to define a closed condition in response to said first reference voltage amplitude exceeding said output voltage amplitude to provide a path for current from said source of supply voltage to said load;
    a source of a second reference voltage;
    a switch means capable of defining either an open or closed condition;
    said switch means defining a closed condition in response to said output voltage amplitude exceeding said second reference voltage amplitude; and
    means connecting said switch means to said source of supply voltage for diverting current from said path therethrough to thus switch said rectifier to said open condition.

2. The apparatus of claim 1 including means independent of said supply and output voltage for switching said switch means from a closed to an open condition after a predetermined duration.

3. The apparatus of claim 1 wherein said switch means comprises a second controlled rectifier having an anode, a cathode, and a gate;
    means connecting said second rectifier anode to said first rectifier anode through said first impedance;
    energy storage means connecting said second rectifier cathode to a fixed potential; and
    a current control means responsive to the relative amplitudes of said second reference voltage and said output voltage connected to said second rectifier gate.

4. The apparatus of claim 3 wherein said energy storage means comprises a resistor and a capacitor connected in parallel.

5. The apparatus of claim 3 wherein said current control means includes a transistor having an emitter, a collector, and a base;
    means respectively applying said output voltage and said second reference potential to said emitter and said base; and
    means connecting said collector to said second rectifier gate.

6. An apparatus responsive to a source of cyclic direct current supply voltage of varying amplitude for providing to a load a direct current output voltage whose amplitude remains within predetermined limits comprising:
    first and second circuit branches each connected to said source of supply voltage;
    said first circuit branch comprising a relatively high impedance branch including a controlled rectifier in series with said load, said rectifier capable of respectively defining open and closed states;
    said second circuit branch comprising a relatively low impedance branch including a switch means capable of respectively defining open and closed states;
    means establishing first and second reference voltages;
    means responsive to said first reference voltage exceeding said output voltage for switching said controlled rectifier to said closed state to thus provide a current path therethrough from said source of supply voltage to said load;
    means independent of said supply voltage responsive to said output voltage exceeding said second reference voltage for switching said switch means to said closed state to thus deprive current from said first circuit branch and switch said controlled rectifier to said open state.

7. The apparatus of claim 6 including means for limiting the duration during which said switch means defines said closed state to a period substantially shorter than one cycle of said supply voltage.

References Cited
UNITED STATES PATENTS
3,260,920    7/1966    Shoemaker _____ 321—18
3,281,638    12/1966    Crawford _____ 320—40

JOHN F. COUCH, *Primary Examiner.*

M. WACHTELL, *Assistant Examiner.*